Aug. 22, 1961   J. E. KOVACH ET AL   2,996,782
PALLET SUPPLY AND ACCELERATING APPARATUS
Filed May 15, 1957   3 Sheets-Sheet 1

INVENTORS
JOHN E. KOVACH
CHARLES K. BROWN, JR.
BY Emery, Whittemore
Sandoe & Dix
ATTORNEYS

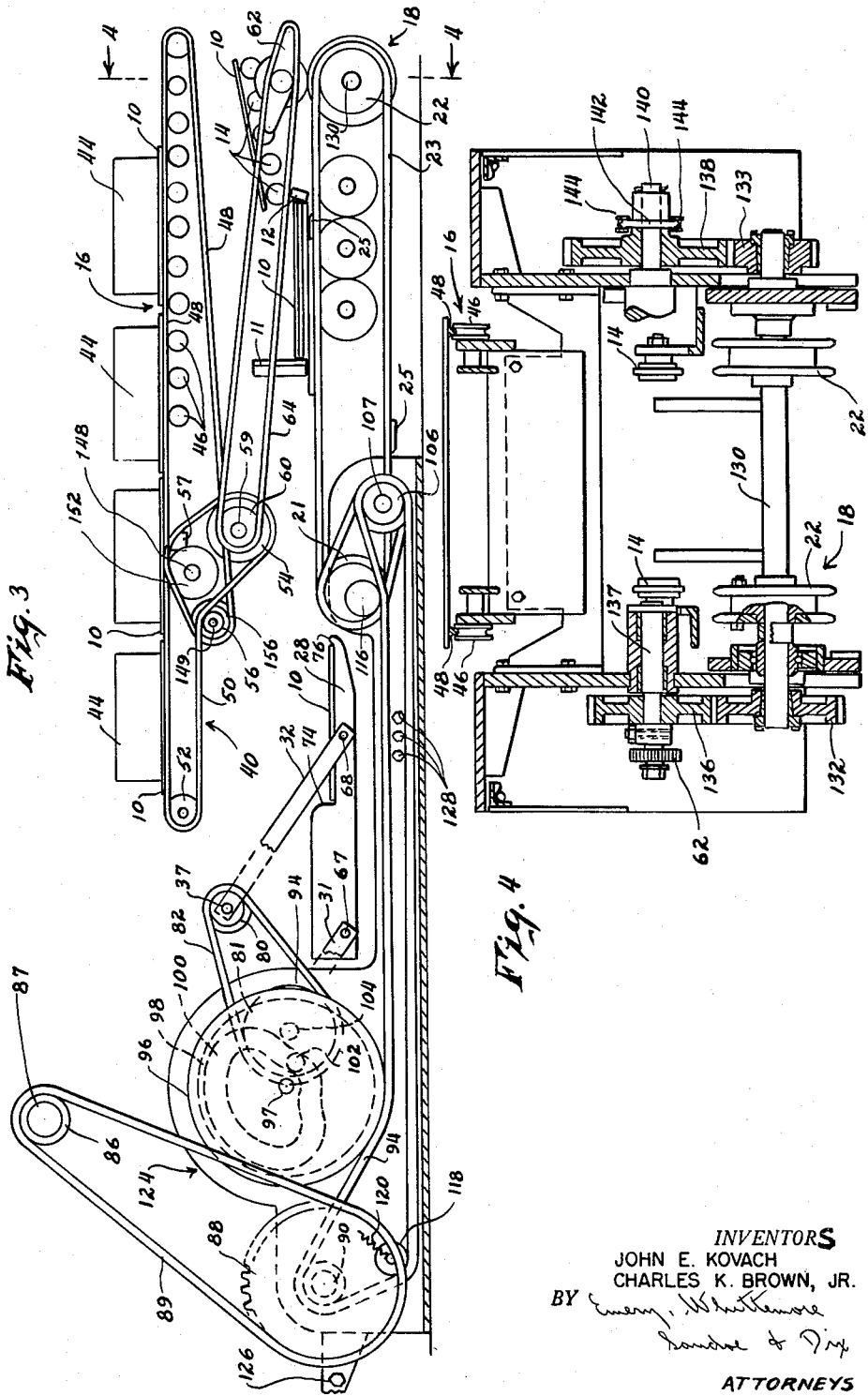

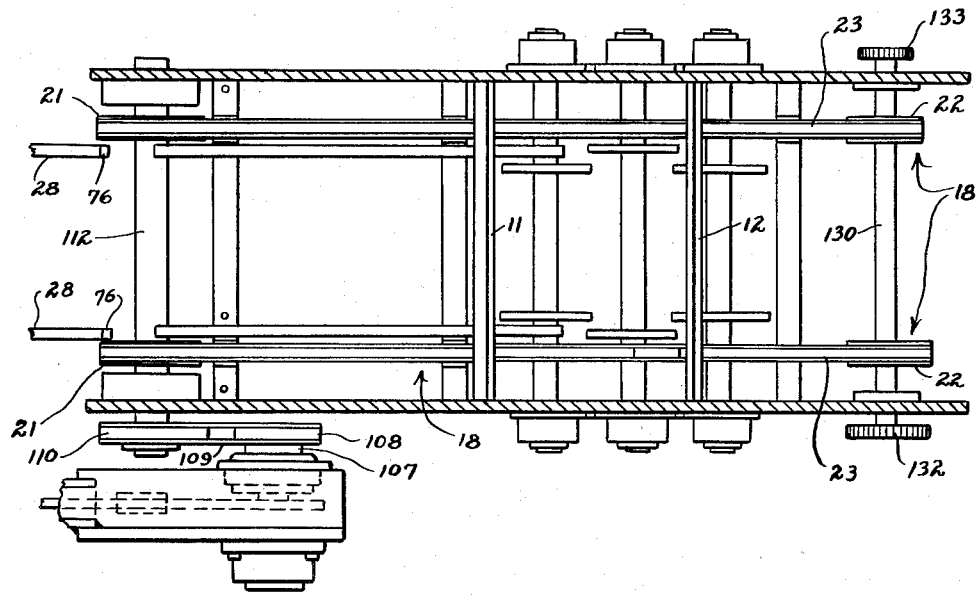
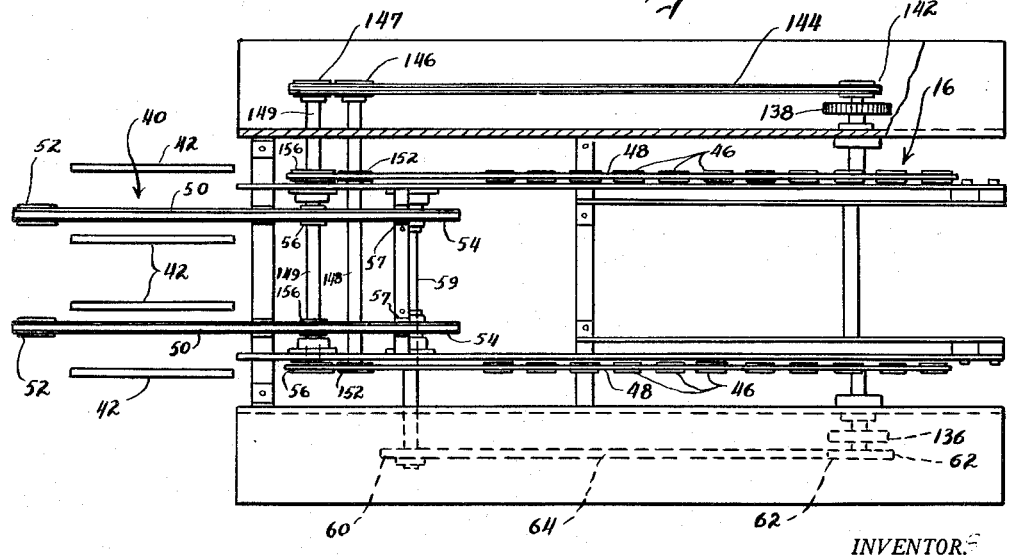

United States Patent Office 2,996,782
Patented Aug. 22, 1961

2,996,782
PALLET SUPPLY AND ACCELERATING APPARATUS
John E. Kovach and Charles Kepler Brown, Jr., Nutley, N.J., assignors to Bergen Machine & Tool Company, Inc., Nutley, N.J., a corporation of New Jersey
Filed May 15, 1957, Ser. No. 659,317
11 Claims. (Cl. 25—41)

This invention relates to machines for making blocks, more especially cinder blocks.

It is an object of the invention to provide an improved machine of the type in which a plain pallet is held against the bottom of a mold during the molding operation, and is then lowered, with a molded block thereon, onto a conveyor at the end of each stripping operation of the machine. More particularly it is an object of the invention to provide such a machine with improved apparatus for handling the pallets.

In accordance with one feature of the invention, pallets are placed in a magazine, preferably under the delivery table of the machine, and these pallets are delivered one at a time to pallet-supporting fingers which are shifted by swinging arms to a pallet delivery position between the mold and the conveyor. There is clearance between the fingers to permit the pallet receivers of a conventional block-making machine to raise the pallet from the fingers into contact with the mold.

In accordance with another feature of the invention, the pallet conveyor accelerates as it moves a loaded pallet from its position under the mold to a delivery table.

In block-making machines of the prior art, in which the loaded pallets have been accelerated in order to move them quickly without shock to the freshly molded block, elaborate and complicated mechanism has been used to obtain the acceleration. It is another object of this invention to obtain acceleration of the loaded pallets with simplified mechanism which can be applied to existing block molding machines. In the preferred embodiment of the invention, the acceleration is obtained by merely using a driving wheel of ellipsoidal contour to drive a belt in the motion transmitting connections to the conveyor. The term "wheel" and "belt" are used herein in a broad sense and include sprockets and chains, respectively.

Another object of the invention is to combine an accelerating conveyor and a delivery table along which the loaded pallets move after coming from the conveyor. This permits the delivery table to operate at a substantially uniform speed to which the conveyor can decelerate when delivering the loaded pallet to the delivery table.

In the preferred construction the conveyor is an endless belt which runs continuously and this permits greater flexibility in the change of conveyor speed since the conveyor can merely slow down to delivery table speed and need not stop as for forward and rearward strokes required with a reciprocating conveyor.

Other objects, features and advantages of the invention will appear or be pointed out as the description proceeds.

In the drawing, forming a part hereof, in which like reference characters indicate corresponding parts in all the views;

FIGURE 3 is a diagrammatic side elevation of the parts of a block-making machine to which this invention applies;

FIGURE 4 is an enlarged sectional view at the station 4—4 of FIGURE 3 showing the driving connections and bearings of the apparatus illustrated diagrammatically in FIGURE 3; but with the sprocket chains or belts omitted for clearer illustration;

FIGURE 5 is a plan view of the pallet feed mechanism which supplies pallets to the fingers shown in FIGURE 2; and FIGURE 6 is a plan view, on a slightly larger scale than FIGURE 3, of the conveyor and delivery table shown in FIGURE 3.

Figure 1:
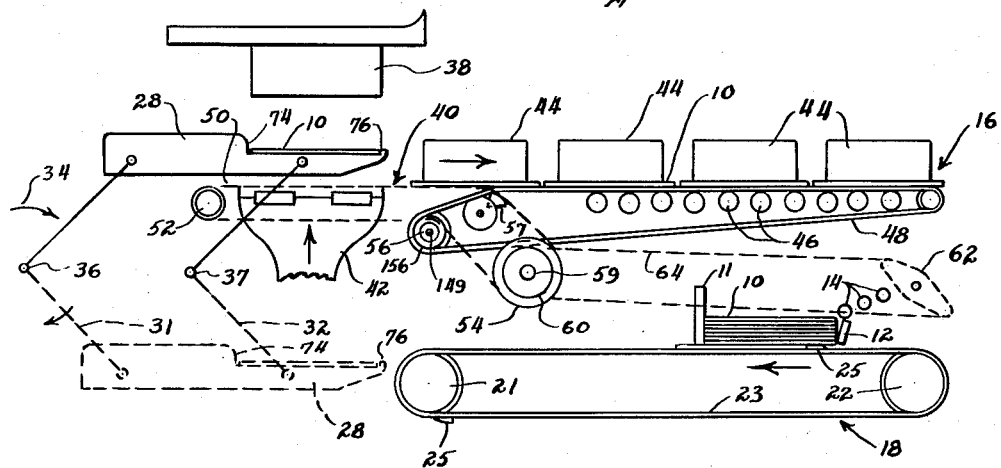
FIGURE 1 is a diagram illustrating the layout of a machine embodying this invention, the dimensions and locations of the parts being distorted in order to make the diagram a clearer illustration.

The diagrammatic layout of FIGURE 1 shows a stack of pallets 10 located in a magazine having a front wall 11 and a back wall 12. Pallets are supplied to the magazine by placing them on a roller conveyor 14 which leads from the front of the block-making machine, under a delivery table 16, to the magazine in which the stack of pallets 10 is located.

There is a pallet feeder 18 comprising wheels 21 and 22 around which an endless belt or chain 23 passes. Dogs 25, attached to the chain 23, displace the bottom pallet 10 from the stack in the magazine and deliver it to pallet-supporting fingers 28 located beyond the wheel 21. The pallet fingers 28 are supported by two arms 31 and 32 which swing counter-clockwise, as indicated by the arrow 34. The arms 31 and 32 are pivotally supported from shafts 36 and 37. These arms 31 and 32 form, with their supports and the fingers 28, a folding parallelogram linkage which causes the fingers 28 to swing through parallel positions to a pallet delivery position in which the fingers 28 are shown in solid lines in FIGURE 1 between a mold 38 and a conveyor 40. It will be understood that there are similar wheels 21 and 22 with a chain 23 on the other side of the machine. Similarly, there are arms 31 and 32 at both sides of the machine for supporting opposite sides of the assembly comprising the pallet supporting fingers 28.

Pallet receivers 42 lift the pallet 10 from the fingers 28 and move it into contact with the bottom of the mold 38. At the end of a molding operation, the pallet receivers 42 lower the pallet 10, with a block thereon, onto the conveyor 40. This is part of the block-stripping operation of the machine and is well understood in the art. The conveyor 40 moves the loaded pallets to the delivery table 16. The loaded pallets 10 and their blocks 44 travel along the delivery table to an off-bearing position at the end of the delivery table remote from the conveyor 40.

In the construction illustreated, the delivery table has rollers 46 supporting an endless belt 48 on which the pallets rest. The belt 48 is driven by power means which will be explained in connection with one of the other figures.

The conveyor 40 includes an endless belt 50 which reverses its run around a wheel 52 behind the molding station and around another wheel 54 ahead of the molding station. The conveyor belt 50 changes its direction by passage over an intermediate wheel 56 and a fixed guide 57.

The belt 50 is driven by the wheel 54 which is secured to a shaft 59 with another wheel, preferably a sprocket 60. This wheel or sprocket 60 is driven from an ellipsoidal wheel or sprocket 62 through a belt or chain 64. Because of the shape of the ellipsoidal wheel 62, the linear speed of the belt 64 varies and produces a variable speed of the wheels 60 and 54, and the conveyor belt 50.

The ellipsoidal wheel 62 is driven in timed relation with the block-molding machine so as to give the conveyor 40 its minimum speed at the time that a loaded pallet is being deposited on the conveyor. As the ellipsoidal wheel 62 continues its rotation, its effective radius increases and this causes an acceleration in the speed of the belt 50 of the conveyor 40 so that the block is moved away from the molding station to the delivery table 16 quickly but without jarring the freshly molded block on the pallet.

Depending upon the gear ratios of the machine, the conveor 40 can be moving at any desired speed at the time the loaded pallet passes from the conveyor to the delivery table, and the conveyor is preferably travelling at the delivery-table speed or somewhat faster with the final deceleration caused by sliding of the pallet on the delivery table.

Figure 2:
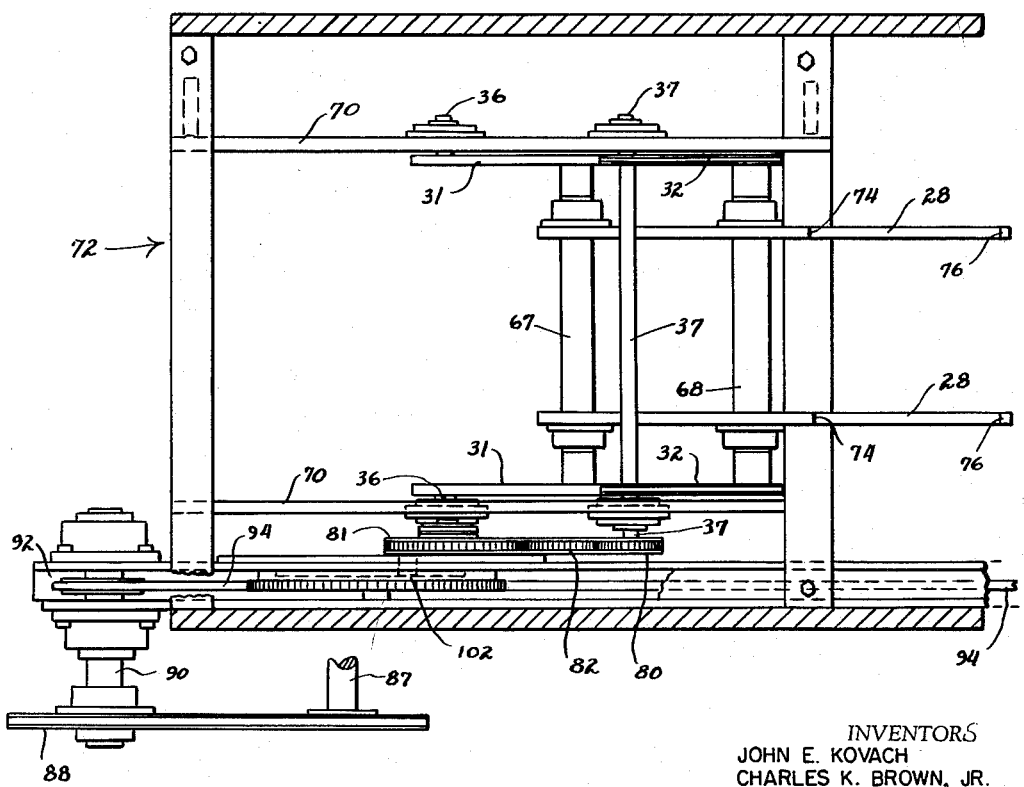
FIGURE 2 is a fragmentary view, partly in section, showing the pallet-supporting fingers of the invention and the operating mechanism for these fingers.

FIGURE 2 shows the actual construction of the pallet-supporting fingers 28. There are preferably at least two such fingers for providing stable support for the pallets. The fingers 28 are connected by shafts 67 and 68. There are arms 31 and 32 at both ends of the shafts 67 and 68. The shaft 67 provides a pivotal connection between the fingers 28 and the lower ends of the arms 31. The shaft 68 provides a similar pivotal connection between the fingers 28 and the lower ends of the arms 32.

The shafts 36, at the upper ends of the arms 31 are supported from beams 70 forming a part of a frame 72 of the machine. The shaft 37 extends all the way across the space between the arms 32 and is secured to the arms to supply power for moving the arms 32 angularly about the axis of the shaft 37. The arms 31 and 32 are preferably of the same length and always parallel to one another. The shafts 36 are spaced far enough apart from the shaft 37, in proportion to the lengths of the arms 32, to permit the arms 32 to swing past the upper ends of the arms 31 as these arms 31 and 32 move angularly, in a counter-clockwise direction, about the bearings 36, as indicated by the arrow 34 in FIGURE 1. If a shorter distance is desired the arms are off-set.

Although the proportions are distorted in the diagram comprising FIGURE 1, this figure serves as an elevation of the fingers 28 and shows a shoulder 74 which limits the extent to which the pallet 10 slides rearwardly on the fingers 28. FIGURE 1 also shows a lip 76 at the forward end of the fingers 28 for preventing the pallet 10 from being displaced forwardly on the fingers 28.

At the end of the shaft 37 there is a sprocket 80 and this sprocket is driven from another sprocket 81 through a chain 82. FIGURE 3 shows the motion-transmitting means through which the sprocket 81 is driven from a main sprocket 86 secured to the main shaft 87 of the block-making machine.

The sprocket 86 drives a large sprocket 88 through a chain 89. This sprocket 88 is on a shaft 90 with another sprocket 92 that drives a long chain 94 through which power is transmitted to all of the driven parts of the apparatus of this invention. This long chain 94 engages a large sprocket 96 secured on a shaft 97 with a cam 98. This cam 98 has a groove 100 into which a follower 102 extends.

The follower 102 is attached to the sprocket 81 and causes the sprocket to rotate back and forth in response to the contour of the cam groove 100 about the axis of a shaft 104 by which the sprocket 81 is supported. This rotation of the sprocket 81, first in one direction and then the other, causes the arms 31 to swing through the angular displacement necessary to move the pallet-supporting fingers 28 from their pallet-receiving positions, shown in FIGURE 3, to their pallet-delivery positions, shown in full lines in FIGURE 1, as previously explained. The arms 31 follow the movement of the arms 32 as idlers.

Because of the substantially larger diameter of the sprocket 81 as compared with the sprocket 80, a comparatively small angle of rotation of the sprocket 81 causes a substantially larger angular movement of the sprocket 80 and the arms 32.

The long chain 94 extends beyond the sprocket 96 to another sprocket 106 on a shaft 107 with a second sprocket 108 (FIGURE 5). The sprocket 108 drives a chain 109 which rotates another sprocket 110 on a shaft 112. The wheels 21 are secured to this shaft 112, and the shaft 112, is, therefore, the drive shaft for the pallet feeder 18.

Referring again to FIGURE 3, the long chain 94 has its upper run tensioned by an idler wheel 116; and the lower run of the long chain 94 is tensioned by another idler wheel 118 urged against the chain by a compressing spring 120.

The shafts for supporting all of the various wheels and sprockets, except the sprocket 86 on the main drive shaft of the block-making machine, are carried by a frame, indicated generally by the reference character 124. This frame 124 is shown diagrammatically since the details of it are not necessary for a complete understanding of this invention, but it is a feature of the invention that the frame 124 is secured to the frame of the block-making machine by fastening means 126 and 128 at spaced locations, and by such other fastening means as may be desired for holding the frame 124 against movement relative to the block-making machine.

The wheels 22, at the forward end of the pallet feeder 18, are secured to a shaft 130 which extends across the full width of the machine, as best shown in FIGURE 4. There are gears 132 and 133 secured to opposite ends of the shaft 130. The gear 132 meshes with another gear 136 on a shaft 137 which drives the ellipsoidal sprocket 62.

The gear 133, at the other end of the shaft 130, meshes with a gear 138 on a shaft 140 with a sprocket 142. This sprocket 142 drives a chain 144 (FIGURE 6), which runs to sprockets 146 and 147 at the upper ends of shafts 148 and 149 respectively.

There are rollers 152, secured to the shaft 148 at locations under the top run of the delivery-table belt 48. A portion of the periphery of each of the rollers 152 is flat, as shown in FIGURE 3, for purposes which will be explained, in connection with the operation of the delivery table. On the shaft 149 there are other rollers 156 around which the delivery-table belt reverses its run and by which the delivery-table belt 48 is driven.

The idler rollers 56 are supported from the same shaft 149 as the delivery-table drive rollers 156. From the operating mechanism thus far described, it will be apparent that the conveyor belt 40 is driven at variable speeds, but the delivery-table belt 48 is driven at constant speed, because the motion-transmitting connections for the delivery table are connected with the shaft 130 which operates at constant speed, and which is driven by the belts 23 of the pallet feature.

FIGURE 6 shows the conveyor 40 with its belts 50 passing between the pallet receivers 42, and of narrower gauge than the belts 48 of the delivery table. The conveyor 40 extends for some distance forward (toward the right in FIGURE 5) between the rearward portions of the delivery-table belts 48. In the preferred construction, means are provided for transferring the loaded pallets from the belts 50 of the conveyor 40 to the belts 48 of the delivery table 16.

This transfer means includes the rollers 152 of the delivery table with flat portions (FIGURE 3) on the circumference of these rollers. When the flat portions of the rollers 152 are at the top of the rollers, the delivery-table belts 48 are at a slightly lower level than the belts 50 of the conveyor 40. As the rollers 152 rotate and full diameter portions of these rollers reach the top, the belts 48 of the delivery table 16 are raised above the level of the belts 50 of the conveyor 40 and thus lift the loaded pallets from the conveyor 40.

Before the flat portions again reach the tops of the rollers 152, the loaded pallet has passed beyond the conveyor 40. In the machine shown in the drawing, the rollers 152 raise the belt 12 times in each cycle of the machine, but only one of these operations lifts a loaded pallet, the others being idle movements when there is no loaded pallet over the rollers 57.

One embodiment of the invention has been illustrated and described, but various changes and modifications can be made and some features can be used in different combinations without departing from the invention as described in the claims.

What is claimed is:

1. In a block-making machine, pallet receivers for raising successive pallets into contact with the bottom of a mold and for lowering each successive pallet with a block thereon during the stripping of the block from the mold, a conveyor in position to receive the pallet lowered from the mold, and a delivery table to which the conveyor moves successive loaded pallets, the improvement which comprises a pallet magazine located under the delivery table, a pallet feeder which takes pallets from the magazine one at a time, said pallet feeder operating in a direction to move pallets toward the back of the machine, pallet-supporting fingers movable into a position adjacent to the back of the pallet feeder and below the level of the mold and to which the successive pallets are delivered by the pallet feeder, arms connected to the supporting fingers, bearing means on which the arms swing angularly about axes transverse of the direction of movement of the pallet feeder to move the fingers between a lowered position adjacent to the pallet feeder and a raised position adjacent to and under the mold, the bearing means being at a level between the lowered and raised positions of the fingers so that a portion of the swinging movement shifts the pallets rearwardly and another portion shifts them forwardly as they are lifted to the raised position, under the mold and above the conveyor, there being clearance between the fingers for the pallet receivers to rise and lift the pallet from the fingers to the mold, and power driving mechanism for operating the arms, the pallet feeder and other parts of the machine in timed relation to one another and to the receivers that raise and lower the pallet with respect to the mold.

2. The block-making machine construction described in claim 1 and in which there are two arms on each side of the pallet-supporting fingers, and the arms on each side form, with the pallet-supporting fingers, a folding parallelogram linkage which causes the different positions of the fingers to be parallel to one another as the fingers are shifted from their pallet-receiving position to their pallet delivery position between the mold and conveyor.

3. The block-making machine construction described in claim 1 and in which there are means for moving the conveyor at an accelerating speed, said means including mechanism operated in timed relation with the fingers and the stripper to increase the conveyor speed after the pallet is placed on the conveyor and as the pallet moves away from its position under the mold.

4. The block-making machine construction described in claim 3 and in which the conveyor operates with continuous movement and variable speed, and the operating mechanism for the conveyor is timed with the operation of the machine to obtain the minimum speed at the time of the lowering of the loaded pallet on the conveyor at the end of the stripping operation of the machine.

5. The block-making machine construction described in claim 4 and in which the arms which are connected to the pallet-supporting fingers include two arms on each side of said fingers, and the bearing means supporting the arms are located so that the arms on each side of the fingers form with the fingers folding parallelogram linkages which cause the fingers to move through parallel positions as they swing from their lowered pallet-receiving position to their pallet raised delivery position between the mold and the conveyor, and the power driving mechanism includes a cam for operating the arms for the pallet supporting fingers, the operating mechanism for the conveyor including a chain, an ellipsoidal sprocket that drives the chain, and common operating means for the ellipsoidal sprocket and the arm-operating cam to maintain the operation of the conveyor and fingers in timed relation to one another.

6. In a block-making machine of the class wherein a pallet is held against the bottom of a mold and is then lowered on a conveyor with a molded block thereon at the end of each stripping operation of the machine, the combination with said conveyor of operating mechanism that moves the conveyor with continuous motion, the operating mechanism including means that repetitively varies the speed of said continuous motion through a predetermined cycle, and other operating mechanism that lowers a loaded pallet on the conveyor during a stripping operation, and operative connections to both of the mechanisms synchronising the operation of said mechanisms so as to obtain minimum conveyor speed at the time of contact of the loaded pallet with the conveyor.

7. The block-making machine described in claim 6 and in which there is a delivery table beyond the conveyor to which the loaded pallets are delivered by the conveyor and along which the loaded pallets travel to an off-bearing position at the end of the delivery table remote from the conveyor.

8. The block making machine described in claim 7 and in which the delivery table includes a second conveyor driven at a constant speed at least as fast as approximately the speed of the first conveyor when delivering a loaded pallet to the delivery table.

9. The block-making machine described in claim 7, and in which the operating means for the conveyor includes a driving wheel of different radii at angularly spaced locations around the wheel, and a belt through which the rotation of the driving wheel is transmitted to the conveyor to produce variations in the conveyor speed in proportion to changes in the effective radius of the driving wheel.

10. The block-making machine described in claim 9 and in which the driving wheel has its maximum radius at two diametrically opposite locations around its periphery and has its minimum radius at two other diametrically opposite locations around its periphery.

11. In a block making machine, pallet receivers for raising successive pallets into contact with the bottom of a mold and for lowering each successive pallet with a block thereon during stripping of the block from the mold, a conveyor in position to receive the pallet lowered from the mold, a delivery table to which the conveyor moves successive loaded pallets, a pallet magazine located under the delivery table and in position to be loaded from a region at the discharge end of the delivery table, a pallet feeder which takes pallets from the magazine one at a time, and advances the pallets along a course under the delivery table and conveyor to a region substantially under the position at which pallets are raised into contact with the bottom of the mold, pallet receiving fingers movable into a position adjacent to the back of the pallet feeder and below the level of the mold and to which the pallet feeder supplies successive pallets, arms supporting the fingers, and pivots about which the arms swing to move the fingers through an arc that shifts the pallets to another position above the pallet receivers and in position to be raised into contact with the bottom of the mold, said pivots being located at a level above the lower positions of the fingers and below the upper positions of the fingers, and means for swinging the arms about the pivots to shift the fingers first downwardly and rearwardly, then upwardly and rearwardly past horizontal positions of the arms, and then upwardly and forwardly past vertical positions of the arms and then forwardly and downwardly into a final position under the mold.

(References on following page)

References Cited in the file of this patent

UNITED STATES PATENTS

| Number | Name | Date |
|---|---|---|
| 1,695,327 | Goldston | Dec. 18, 1928 |
| 1,959,512 | Wall et al. | May 22, 1934 |
| 2,090,928 | Aisher | Aug. 24, 1937 |
| 2,496,000 | Bugenhagen | Jan. 31, 1950 |
| 2,496,016 | Nelson | Jan. 31, 1950 |
| 2,517,905 | Matthews | Aug. 8, 1950 |
| 2,519,994 | Beyersdorfer | Aug. 22, 1950 |
| 2,524,359 | Romie | Oct. 3, 1950 |
| 2,583,597 | Ryner | Jan. 29, 1952 |

FOREIGN PATENTS

| Number | Country | Date |
|---|---|---|
| 107,029 | Great Britain | June 11, 1917 |
| 275,410 | Great Britain | Aug. 11, 1927 |